United States Patent [19]

Riera et al.

[11] Patent Number: 4,653,368
[45] Date of Patent: Mar. 31, 1987

[54] TUBE CUTOFF DIE SET

[76] Inventors: John F. Riera, 3689 Sandburg Dr., Troy, Mich. 48084; John J. Pavelec, 413 Dalton Dr., Rochester; Billy J. Bielawski, Sr., 2270 Flanders Dr., Rochester Hills, both of Mich. 48063

[21] Appl. No.: 805,839

[22] Filed: Dec. 6, 1985

[51] Int. Cl.$^4$ .................. B23D 21/00; B23D 25/04
[52] U.S. Cl. ........................... 83/319; 83/320; 83/519
[58] Field of Search ............ 83/54, 294, 319, 320, 83/519

[56] References Cited

U.S. PATENT DOCUMENTS

| 3,129,624 | 4/1964 | Auer | 83/320 X |
| 3,938,415 | 2/1976 | Borzym | 83/519 X |
| 4,108,029 | 8/1978 | Borzym | 83/319 X |
| 4,109,555 | 8/1978 | Borzym | 83/319 X |
| 4,563,927 | 1/1986 | Kinsley | 83/319 X |

Primary Examiner—James M. Meister
Attorney, Agent, or Firm—Irvin L. Groh

[57] ABSTRACT

A method and apparatus for severing successive lengths of tubing in a die set in which the movement of an upper die shoe is translated by mechanism to clamp the tubing on a lower die shoe, move a notching blade across the clamped tubing to slot the tubing, and pass a cutoff blade through the slot to sever the tubing. Use of a lever arm pivoted to one of the die shoes in combination with a cam on the other die shoe optimizes horizontal movement of the notching blade relative to vertical movement of the die shoes. In a preferred form, the cutoff blade is passed through a slot in the notching blade holder. The die set can be used in apparatus where the tubing is intermittently supplied, or, as in a tubing mill, a continuous length of tubing is moved during the severing process.

9 Claims, 11 Drawing Figures

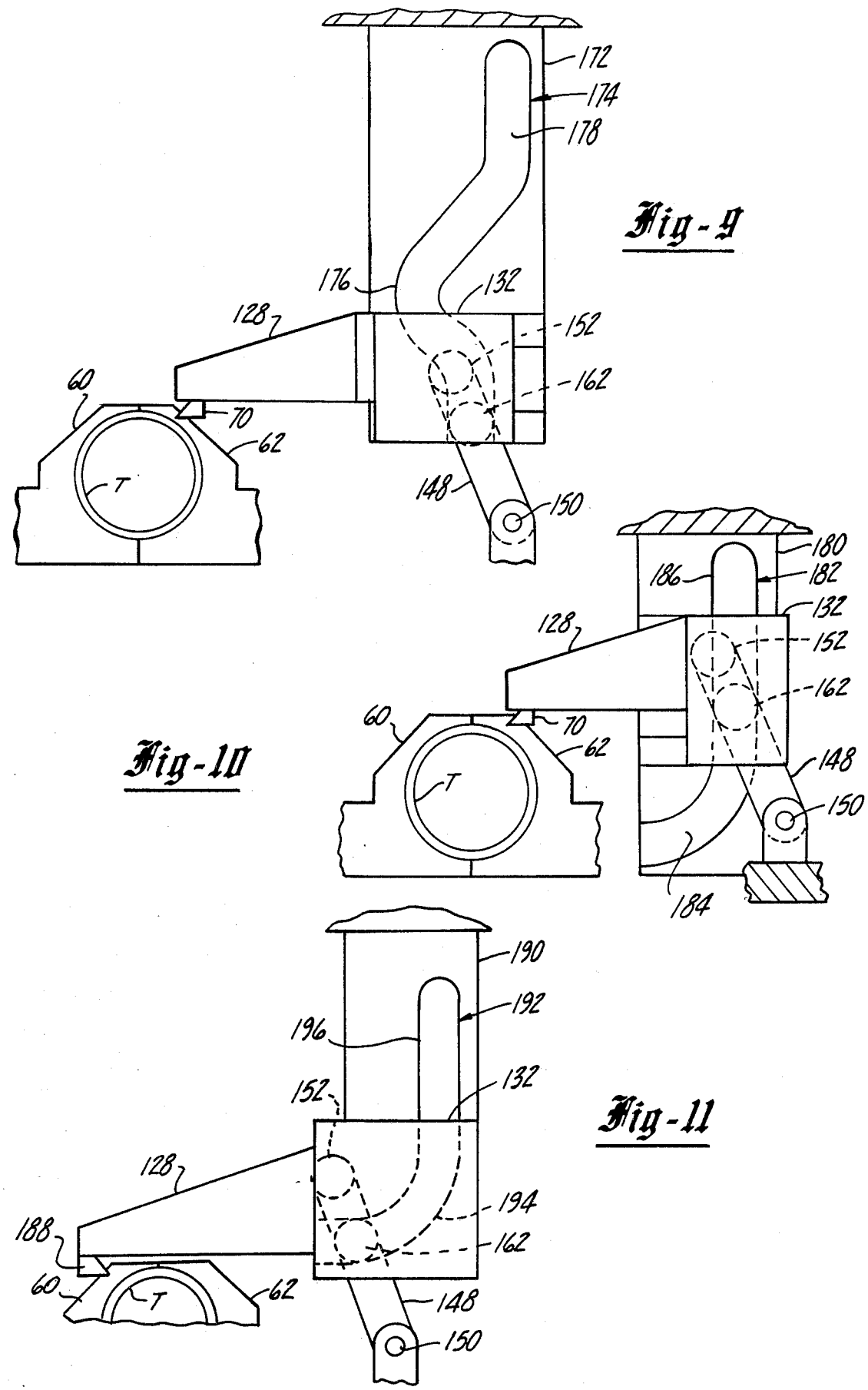

TUBE CUTOFF DIE SET

This invention relates to a tube cutoff die set, and, more particularly, to an improved mechanism which provides a notching cut in a tubing wall followed by a severing cut.

It is well known that in rapid tube cutting where a shear knife is used, if the tubing has not been previously notched or slotted, the initial contact of the severing blade will cause an indentation toward the center of the tube cross section, leaving the severed tube end with its edge bent inwardly. To eliminate this problem and produce a clean cut, a scarfing or notching blade is universally used to first produce a slot in the tube wall through which the cutoff blade is passed to sever the adjacent tube sections without distortion.

Typically, the notching and severing is performed with a die set in which a pair of complementary jaws are closed to clamp and hold the tubing. A slotting blade is then passed horizontally across the tubing creating a chordal slot in the top cross section of the tube. A V-shaped cutoff blade is passed downwardly through the slot with the blade vertex moving along the center line of the tube cross section severing the tube without distortion of the tube ends.

The tube clamping jaws are mounted on slides on a lower die shoe and are controlled by a pair of cam followers which are actuated to open and close by a wedging cam attached to a movable upper die shoe. The notching blade is also mounted on a slide on the lower shoe and moved through the action of a cam follower associated with the slide and a slotted cam attached to the upper movable die shoe. The cutoff blade is attached to the upper movable die shoe and is passed through the tube slot on the downward stroke of the upper movable die shoe. The movement of the clamping jaws and both blades is synchronized by the cams, affecting the cutoff in a single vertical reciprocation of the upper die shoe.

The die set can be used to cut sections of tubing as it is being continuously manufactured. In such case, the upper and lower shoes are mounted on suitable guides or ways so that they can travel with the moving tubing during the entire cutoff cycle. It is readily apparent that in order to minimize the vertical stroke and the horizontal displacement of the die set or to accommodate an existing machine configuration, the design of the operating mechanism must be optimized. It is to such optimization that the present invention is directed.

It is an object of this invention to maximize the horizontal movement of the slotting blade in relation to the vertical movement of a reciprocating upper die shoe;

It is another object of this invention to affect such optimization independent of whether the slotting blade is pushed or drawn across the tubing in its slotting stroke;

It is still another object of the instant invention to configure the slotting blade slide so that movement of the slotting and severing blades is affected without interference in a push-through slotting stroke;

It is yet another object to provide a method of severing successive lengths of tubing where the tube can be severed in the successive steps of pushing a notching blade across the tubing and passing a cutoff blade through the formed slot without the intervening step of returning the notching blade to its initial position.

The foregoing objectives are accomplished in a tube cutoff die set designed for use in a vertically reciprocating press normally having a movable upper die shoe and a stationary lower die shoe. Guide posts and associated bearings are affixed to the shoes for guiding the relative reciprocation between the shoes. Tube holding means in the form of complementary die jaws are mounted on the lower shoe for releasably clamping the tube between the jaws and on both axial sides of the severing plane.

A slide containing a slotting blade holder is mounted on the lower shoe for moving a slotting blade in the severing plane for notching the upper wall of the tube. A speed link or lever arm is pivotally connected to the upper or lower shoe for swinging movement in a plane parallel to the severing plane. A driver, which can conveniently take the form of a roller, is mounted on the speed link adjacent to its free end. The driver is held in contact with the slotting blade slide so that it moves the slide toward or away from the clamped tubing on the lower shoe as the link is rotated. A cam is mounted on the other of the two shoes and has a slot or follower surface which is located in a plane that is parallel to the severing plane. A cam follower is mounted on the speed link intermediate its pivot and free ends, closer to the free end, and in contact with the cam surface. The cam follower is typically a roller which will remain in rolling contact with the cam slot.

In the preferred embodiment, the speed link is pivotally mounted to the lower stationary shoe and the cam is mounted on the moving upper shoe. The cam slot or surface is configured so that as the upper shoe is moved relative to the lower shoe, the cam follower will move transversely, swinging the speed link to move the driver a greater distance transversely and hence the slide so that the slotting blade moves across the tube to notch the tube in a stroke which has amplified the transverse movement of the cam follower. Further downward movement of the upper shoe in the lower portion of the press reciprocation stroke moves the cutoff blade through the notched tube wall to sever the tube.

Preferably the notching or slotting blade is pushed across the tubing in the slotting stroke so as to have the structural integrity of the slide behind the blade. To accomplish this, the cam surface is configured so that as the upper shoe is moved downwardly toward the lower shoe, the cam follower will be moved transversely swinging the speed link to move the slide in a work stroke toward the tube pushing the slotting blade across the tube and notching the tube. Further downward movement of the upper shoe moves the cutoff blade through the notched tube wall severing the tube. In order to effect the successive motions without retraction of the slotting blade slide, the slotting blade holder has a slot in the severing plane so that as the cutoff blade descends, it passes through the holder slot and through the notched tube wall to sever the tube. In maximizing these movements, a portion of the notching and severing strokes can occur simultaneously so that as the notching blade is finishing its stroke, the severing blade has commenced passing through the slotting blade holder.

Where space limitations are not as critical or where a portion of the apparatus may extend downwardly below the lower shoe, a push through slotting cycle can be accomplished with a cam having a dog leg configuration so that as the upper shoe is moved downwardly toward the lower shoe, the cam follower will be moved transversely, swinging the speed link to move the slide in a work stroke toward the tube pushing the slotting blade acros the tube to accomplish the notching. The cam then effects returning the slide to its initial position, and further downward movement of the upper shoe moves the cutoff blade through the notched tube wall severing the tube.

In another configuration which permits the speed link to be used in a push through notching cycle, the cam surface is configured so that as the upper shoe is moved upwardly from a mid position between its upper and lower limits, the cam follower will be moved transversely, swinging the speed link, to move the slide in a work stroke towards the tube pushing the slotting blade across the tube and notching the tube. When the upper shoe reverses direction and moves downwardly toward the lower shoe, the cam follower will follow the same cam configuration to pull the slotting blade back across the tube returning the slide to its initial position where it will remain as the upper shoe continues its downward descent past the mid position moving the cutting blade through the notched tube wall severing the tube. The cutoff blade is withdrawn when the upper shoe commences its upward stroke completing the cycle at the mid position.

The improved mechanism incorporating the speed link is likewise not limited to its use in devices in which the slotting blade is pushed through the tube. In another embodiment, the slotting blade can be shaped with a hook type structure so that it can be drawn across the tubing in its notching stroke. The cam is so configured that as the upper shoe is moved downwardly from its top position, the cam follower will move transversely, swinging the speed link to move the slide in a work stroke toward the tube drawing the slotting blade across the tube and notching the tube. The continuing downward movement of the upper shoe in the lower portion of the press reciprocation stroke moves the cutoff blade through the notched tube wall severing the tube. The cutoff blade is removed from the work during the lower half of the upward stroke, and the notching blade slide is returned across the tube area in the upper half of the upward stroke.

Slotting of the notching blade holder permitting passage of the cutoff blade therethrough, provides a greatly improved push through notching blade cycle even without the use of the speed link. In operation, successive lengths of tubing can be severed by the steps of pushing the notching blade across the tubing to produce the slot in the outer periphery of the tubing; passing the cutoff blade through the slot and severing the tubing; withdrawing the cutoff blade from the area of the tubing; pulling the notching blade across the tube area to return the blade to its initial position; and repeating the forgoing steps in the same sequence.

The preferred embodiments of the invention are illustrated in the drawing in which.

Figure 1:
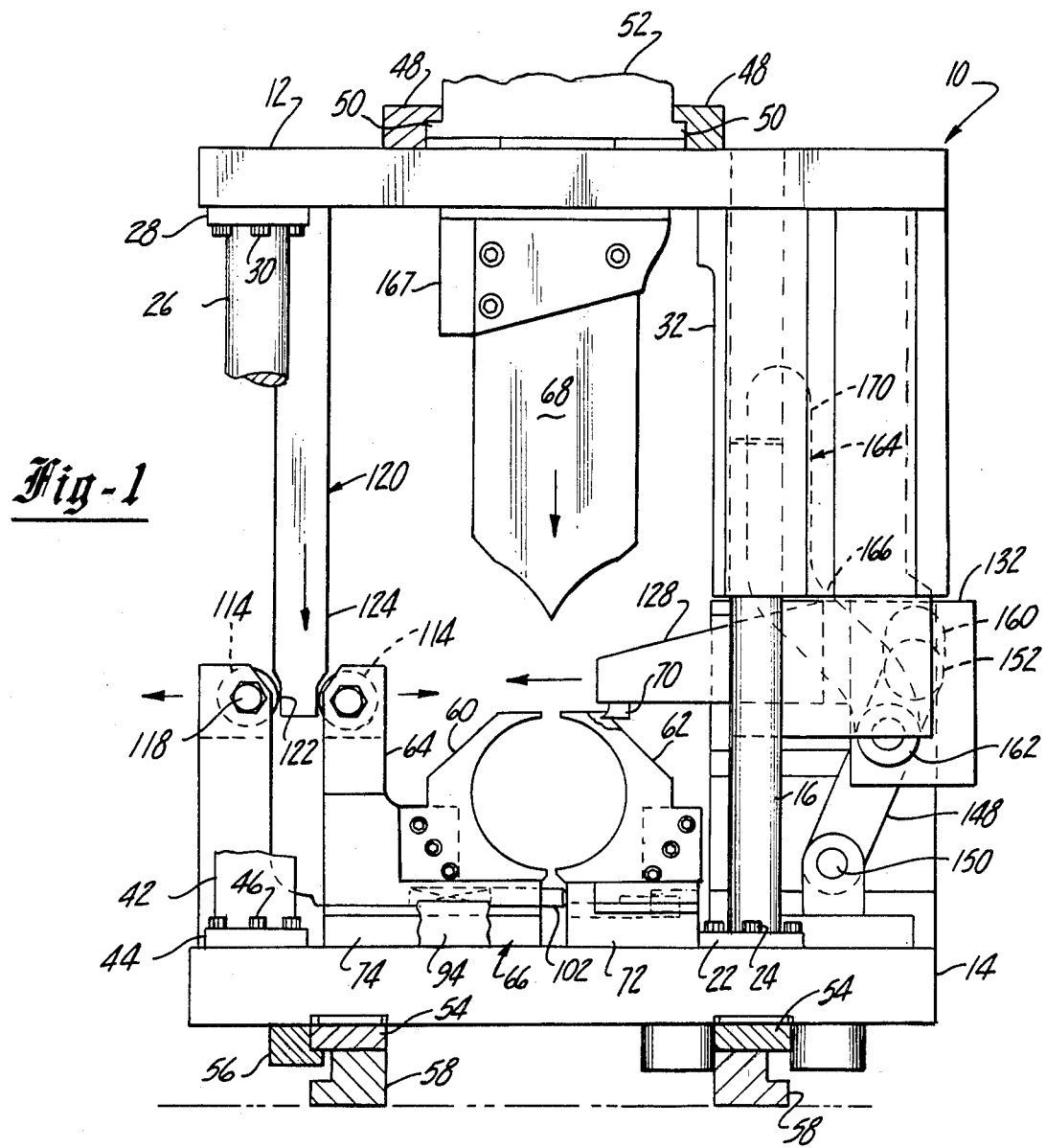
FIG. 1 is a front elevational view showing the slotting and cutoff blade in their starting position with the clamping jaws open to receive the tubing and the speed link and cam mechanism positioned to commence a push through slotting blade stroke upon initiation of the down stroke of the upper movable shoe.
Figure 2:
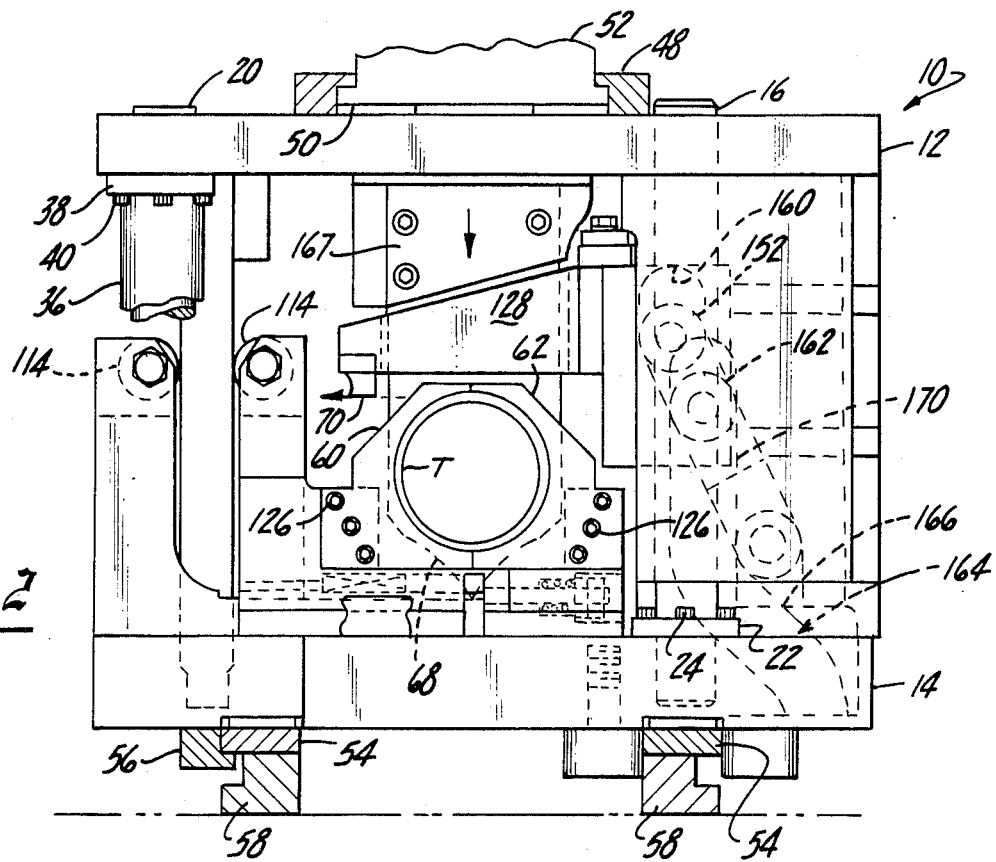
FIG. 2 is a front elevational view similar to FIG. 1 showing the upper shoe positioned at the completion of the downward stroke, the slotting and severing stroke having been completed with the cutoff blade passing through the slotting blade holder.
Figure 3:
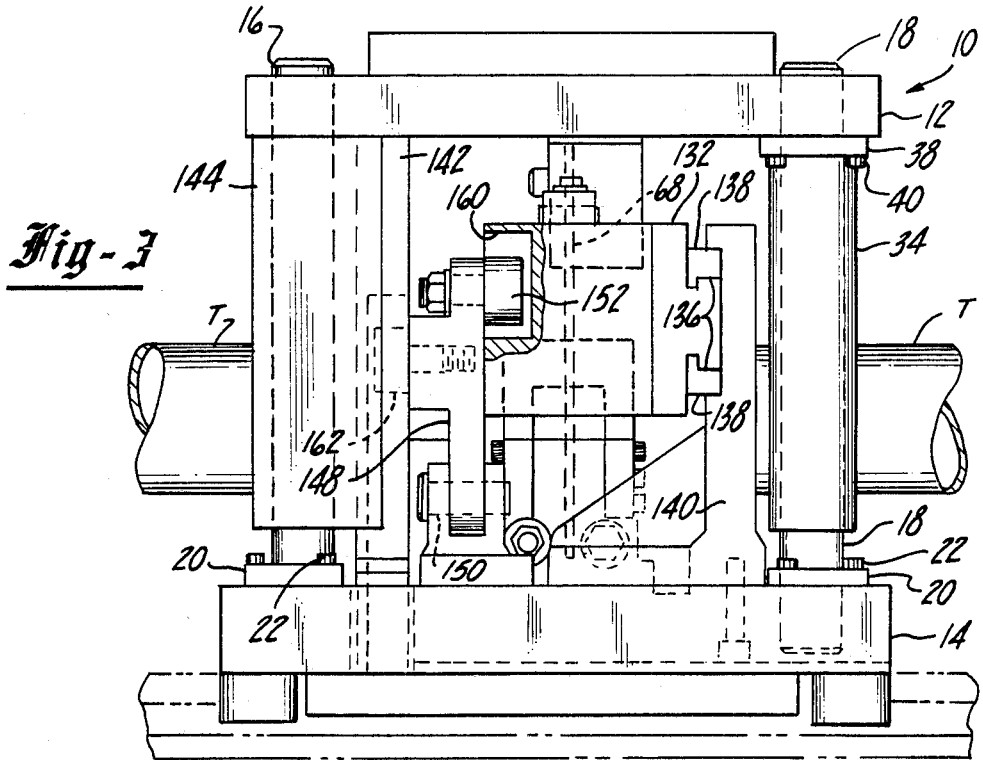
Figure 4:
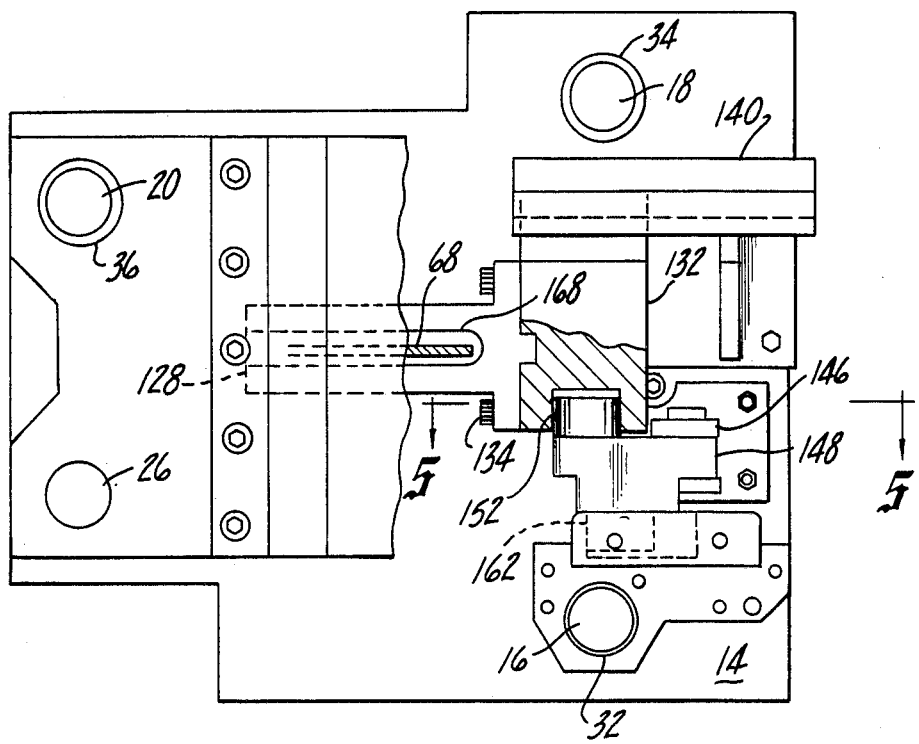

FIG. 3 is a end view of the apparatus shown in FIGS. 1 and 2 at the completion of the downward stroke as shown in FIG. 2 with the tubing extending through the die set in the as clamped position and with a portion broken away to show the attachment of a driver to the speed link and its coaction with the slotting blade slide as well as the pivotal mounting of the speed link to the lower shoe and the mounting of a cam follower on the link;

FIG. 4 is a plan view with a portion of the slotting blade slide broken away to show the driver and speed link and also showing the cutoff blade passing through the slotting blade holder.

Figure 6:
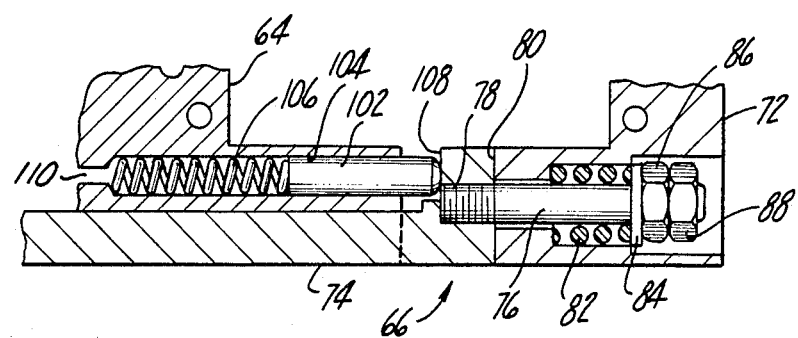
Figure 5:
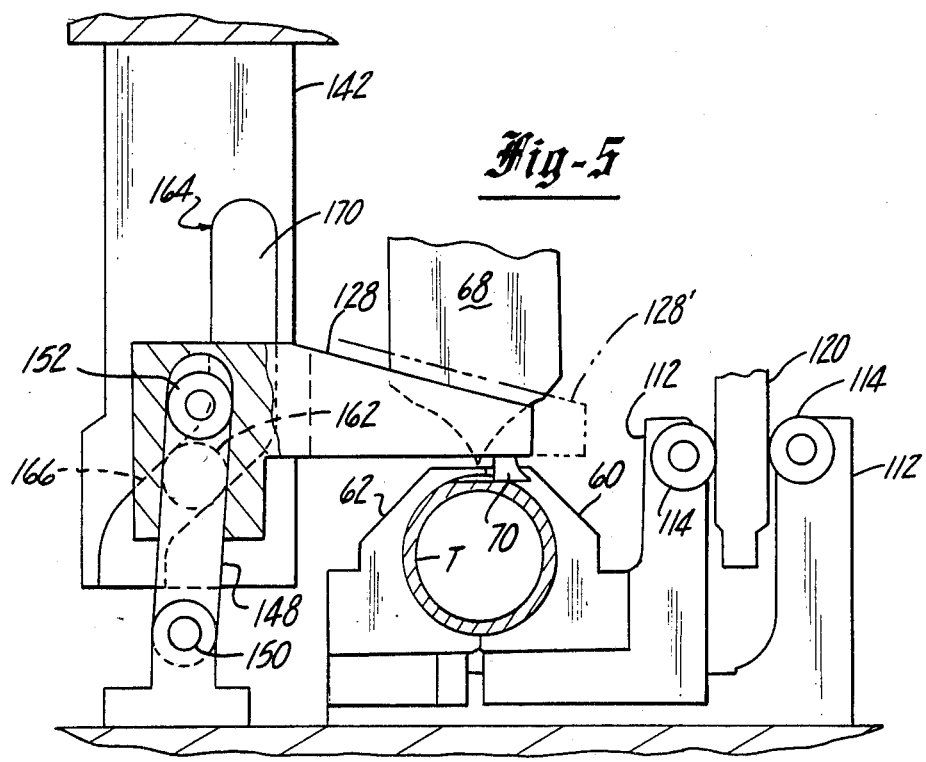
Figure 7:
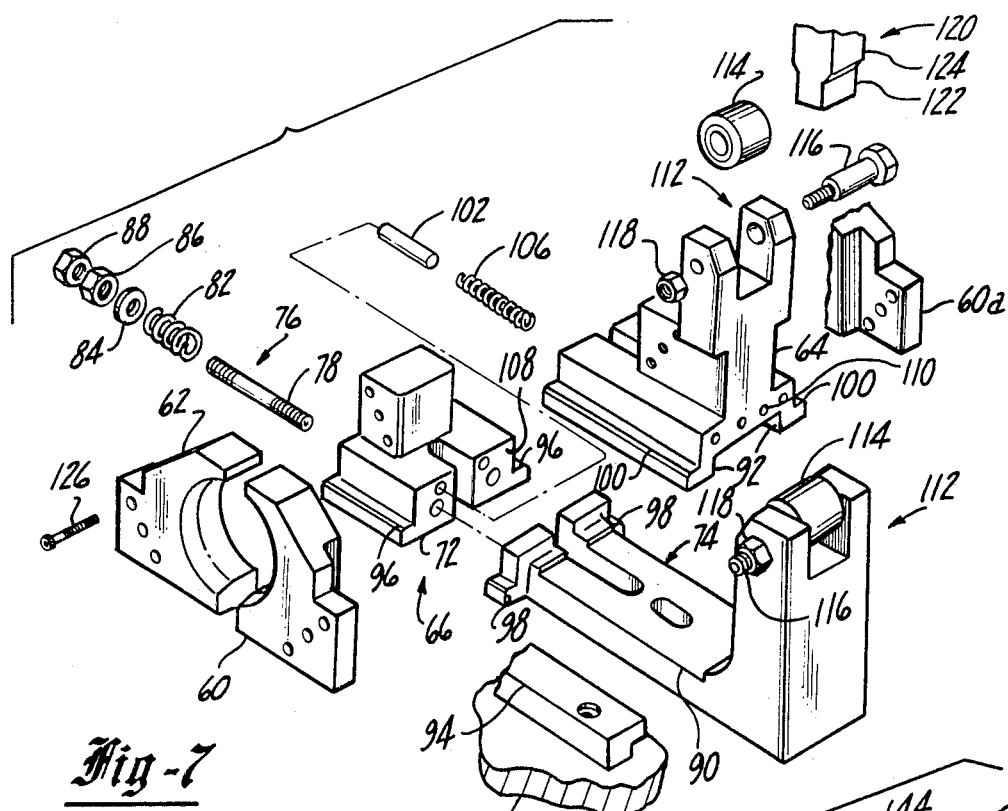
Figure 8:
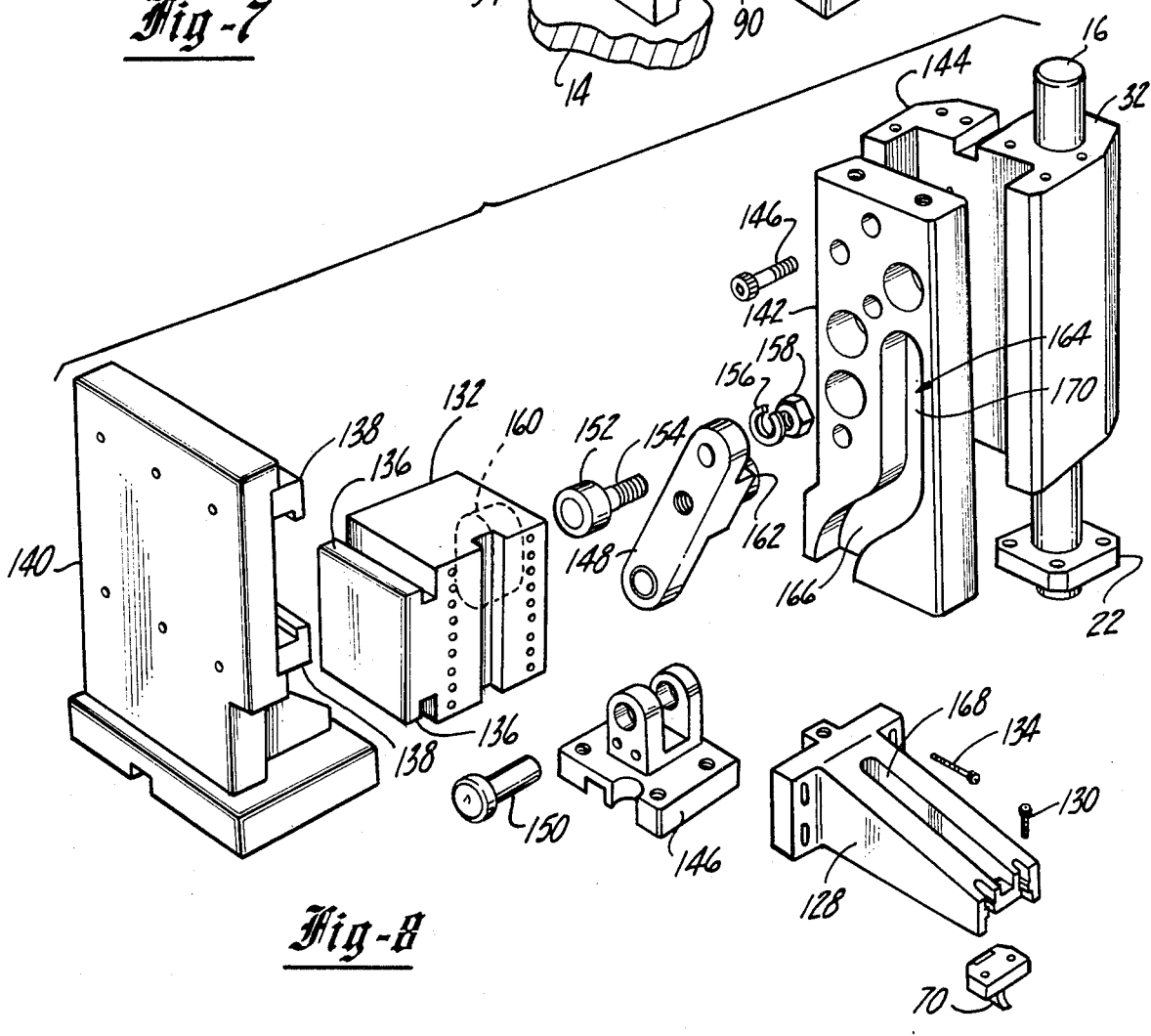

FIG. 5 is an elevational view taken along line 5—5 of FIG. 4 showing entry of the cutoff blade through the slotting blade holder as a notching stroke approaches its completion, the completed position being shown in dotted lines;

FIG. 6 is a fragmentary sectional view showing one of the preload springs which maintains the clamping jaws in an open position prior to cam closure and one of the overload springs which yields only when foreign matter is present between the clamping jaws and tube to prevent destruction of the equipment;

FIG. 7 is an exploded perspective view showing the clamping jaws and their slides with attached cam follower rollers and the clamping cam;

FIG. 8 is an exploded perspective view showing the slotting blade slide and its frame support structure with the slotting blade holder and blade being driven through the pivoted speed link and the actuating cam and speed link follower;

FIG. 9 through FIG. 11 are schematic views showing the slotting blade holder and tube and its relationship to the speed link driving mechanism and cam configured to accomplish a particular slotting stroke wherein:

FIG. 9 shows a slotting blade push through cycle with the cam configured to move the slotting blade through its notching stroke and return prior to a cutoff blade severing stroke;

FIG. 10 shows a push through slotting stroke which is commenced at a midpoint position of the upper shoe to provide the push through notching stroke on the upper half of the upward ram stroke and the return stroke of the notching blade during the first half of the downward stroke prior to movement of the cutoff blade in a severing stroke; and FIG. 11 shows a slotting blade slide configured to perform notching in a draw through stroke with the cam configured to perform the notching during the first half of the downward ram stroke.

Referring to FIGS. 1-4, the tube cutoff die set 10 includes an upper movable shoe 12 and a lower stationary shoe 14 which are held together for guided reciprocation by guide posts 16, 18 and 20 mounted on lower shoe 14 by flanges 22 and bolts 24 and guide post 26 mounted on upper shoe 12 by flange 28 and bolts 30. Guide posts 16, 18 and 20 move in guide bearings 32, 34, and 36 mounted to upper shoe 12 by flanges 38 and bolts 40, and guide posts 26 moves in guide bearing 42 mounted to lower shoe 14 by flange 44 and bolts 46.

While die shoe 14 was referred to as a stationary shoe, this only denotes that it is stationary vertically, but the entire die set 10 can be mounted for horizontal movement as where it is associated with a tube mill continuously producing tubing so that the dies must move with the tubing during the cutoff operation. Thus, the upper die shoe 12 can have ways 48 which permit movement along flanges 50 of ram 52, and lower shoe 14 can have bearing plates 54 which ride in ways 56 and guides 58.

Tubing T to be cut into predetermined lengths is passed through the die set 10 a shown in FIG. 3 and is clamped at the beginning of the cutoff cycle between complementary conforming jaws 60 and 62 shown in their open position in FIG. 1 and in their closed or clamped position engaging tube T in FIGS. 2 and 5. Jaws 60 and 62 are mounted on slide 64 and 66 respectfully, both of which are slidably mounted directly on lower shoe 14 for maximum stability. As partially shown at 60a in FIG. 7, each of the jaws 60 and 62 have two complementary portions spaced apart along the length of tube T a distance to provide clearance for passage of the cutoff blade 68 and slotting blade 70 in a single severing plane therebetween. As shown, each jaw portion, 60 and 60a, is mounted on slide 64.

Slide 66 is constructed in two pieces, jaw mounting portion 72 and cam follower portion 74. These two portions, 72 and 74 normally function as one solid unit being interconnected by two heavy spring loaded studs 76. As shown in FIGS. 6 and 7, one end of stud 76 is threaded into the cam follower portion 74 of slide 66 at 78, and the other end of stud 76 extends into jaw mounting portions 72 retaining the two portions in tight abutment at 80 by the action of overload spring 82 acting against lock washer 84 and jam nuts 86 and 88 threaded on stud 76. Overload spring 82 has a high spring rate and will permit separation of the tube carriage parts 72 and 74 only if an extreme overload is imposed on the jaws 62 and 60 as by the accidental inclusion of a scrap chip or other foreign material between the tube wall and one of the jaws.

Jaw slide or carriage 64 straddles rectangular section 90 of slide portion 74 so that side walls 92 of carriage 64 are guided by rectangular section 90. Slides 64 and 66 are mounted for reciprocation on shoe 14 by gibs 94 which guidingly overlap flanges 96 on jaw portion 72 and flanges 98 on follower portion 74 of jaw slide 66 and flanges 100 on jaw slide 64.

Tube engaging jaws 60 and 62 are biased to a open position as shown in FIG. 1 by four spring loaded plungers 102 retained in cavities 104 working against preload springs 106 which push the plungers 102 against the end surface 108 of slide 72, slides 64 and 66 being retained against suitable limiting stops, not shown. Cavities 104 in slide 64 are vented for the plunger action by vent holes 110. The ends of slides 64 and 66 remote from the jaws 60 and 62 have upraised bifurcated pedestal portions 112 which contain roller cam followers 14 mounted by a bolt 116 retained by nuts 118. One or both of the bolts 116 can have its unthreaded cylindrical portion formed as an eccentric shaft so that the initial jaw positions can be adjusted by the angular orientation of the bolts as is well known in the art. Closing movement of the jaws 60 and 62 is effected by the downward movement of rectangular jaw cam 120 moving from the smaller open jaw portion 122 to a larger closed jaw portion which moves pedestals 112 apart and the jaws 60 and 62 together in clamping position against the force of preload springs 106. A new set of jaws 60 and 62 may be substituted to accommodate a different tubing size by removal and reapplication of bolts 126.

The slotting blade 70 is held in blade holder 128 with bolts 130, and the holder 128 is adjustably affixed to cross slide 132 by bolts 134, the adjustability being provided for different sizes of tubing. Cross slide 132 is slidably mounted by way of guides 136 acting in ways 138 on cross slide support 140 affixed to lower shoe 14.

Cross slide cam plate 142 is mounted directly on upper shoe 12 and reinforced by a cam plate support 144 to which it is attached by bolts 146. A portion 32 of cam plate support 144 acts as the guide bearing for guide post 16 as shown in FIG. 8.

Clevis bracket 146 is mounted on lower shoe 14 and pivotally mounts speed link 148 with pin 150. A driver roller 152 is mounted by threaded shaft 154 to the free end of speed link 148 by lock washer 156 and nut 158. Driver 152 engages cross slide 132 in slot or elongated cavity 160 for imparting motion to the cross slide 132 relative to support 140. Cam follower 162 is mounted in a similar fashion on speed link 148 intermediate pin 150 and driver 152, closer to driver 152 for reasons to be explained hereafter. Cam slot 164 is milled in cam plate 142 with a particular configuration so as to engage cam follower 162 to impart a desired motion to the cross slide 132 and slotting blades 70 through driver 152.

In order to optimize the time cycle and space requirements, it is desirable to move the cross slide 132 as rapidly as possible or with as little vertical displacement of the upper shoe as possible to perform the full notching stroke of tube T with slotting blade 70. This has been accomplished in previous arrangements by forming the slope portion 166 of cam slot 164 with the largest angle relative to the vertical as can be tolerated. When this angle increases much beyond 45°, the cam follower 162 tends to jam in the cam slot 164. The speed link accomplishes a further multiplication of the horizontal slotting blade movement relative to the vertical upper shoe movement by the ratio of the lever arm distance between the pivot 150 and the driver 152 to the lever arm distance between the pivot 150 and the cam follower 162. For example, in a practical application where tubes of diameters between 1½ and 4½ inches are being severed, the distance between pivot 150 and driver 152 can be six inches and the distance between pivot 150 and cam follower 162 can be four inches providing a overall stroke amplification of 6/4 or 1.5 to 1. This can significantly reduce the vertical stroke requirements and overall length requirements in continuous operation.

Referring to FIG. 1, the die set 10 is shown in the position to commence the preferred tube cutoff cycle. Upper die shoe 12 is in its upper most position with ram 52 about to begin the downward stroke. Jaw cam 120 is shown with its narrower portion 122 in contact with roller cam followers 114 providing the open position of tube clamping jaws 60 and 62 maintained by the force exerted by preload springs 106 exerting pressure on plungers 102 providing an opening force between jaw slides 64 and 66. As ram 52 descends tube T is inserted in the jaws 60 and 62 and clamping takes place as a large portion 124 of jaw cam 120 passes between follower rollers 114 to clamp the tube with the correct predetermined length to be severed. Cutoff blades 68 being affixed to the upper shoe 12 by clamping fixture 166 is moved continuously towards it severing stroke which occurs during the bottom half of the downward stroke of upper shoe 12. The most desirable scarfing or notching stroke is accomplished when the slotting blade 70 pushed through tubing wall T creating slot approaching the wall a thickness in the upper portion of the clamped tubing T as shown in FIG. 5. In order to maximize the movements of the horizontally travelling slotting blade 70 with the vertical movement of cutoff blades 68, the mechanism including cam 142 has been designed to commence the severing action of cutoff blade 68 upon the completion of the notch formed by slotting blade 70 without retraction of the cross slide 132 and slotting blade 70. In order to accomplish this, slotting blade holder 128 is formed with a vertical slot 168 in the severing plane as shown in FIGS. 4 and 8.

As soon as jaws 60 and 62 have clamped the tubing, cross slide 132 commences the slotting stroke by the movement of cam follower 162 in cam slot 164 in the direction of the tube T. This causes speed link 148 to rotate about pivot pin 50 causing the drive roller 152 in slot 160 to commence moving slide 132. As the cam follower 162 moves in the sloped portion 166 of cam slot 164, slotting blade 70 notches the tubing. As viewed in FIG. 1, speed link rotates in a counterclockwise direction moving cam follower 162 and driver 152 to the left moving the cross slide 152 with blade holder 128 and slotting blade 70 to the left. As viewed from the other side as shown in FIGS. 5 and 8, the speed link is rotating in a clockwise direction which affects the slotting motion to the right. As can be clearly seen in FIG. 5, the cutoff blade 68 has entered the notching blade holder slot 168 to a substantial extent before slotting blade 70 completes its notching stroke. The notching stroke is completed and the cross slide 132 remains stationary for the remainder of the severing stroke as the cam follower 162 enters the vertical portion 170 of cam track 164. This final, stationary, position of the slotting blade holder is shown in dotted lines in FIG. 5 at 128', FIG. 2 shows the cutoff blade 68 at the completion of the severing stroke with the upper shoe in its lower most position. Both the stock portion and the severed portion of tube T remain clamped in jaws 60 and 62. As the upward stroke of the ram 52 takes place, cam follower 162 retraces its path along cam track 164 so that as it travels along vertical portion 170, cross slide 132 remains stationary and severing blade 68 is withdrawn from the tube area. As the follower enters the sloped portion 166 of cam track 164, the cross slide returns the slotting blade 70 to its initial position as shown in FIG. 1. Unclamping of the tube T takes place at the uppermost portion of the upward stroke as cam portion 122 again enters between follower rollers 114 releasing the jaws.

Slotting of the notching blade holder 128 makes possible a heretofore unattainable method of operation in a push through slotting and severing cycle. This method includes the steps of:

1. pushing a slotting blade across a tube to notch the tube;
2. passing the cutoff blade through the formed notch and severing the tube;
3. withdrawing the slotting blade from the area of the tube;
4. pulling the slotting blade across the tube area to return the blade to its initial position. With a continuously moving tube, these four steps would be sequentially repeated.

The use of the speed link in producing an amplification of a transverse movement necessary for the slotting stroke relative to the vertical ram stroke over that possible where the cross slide is driven directly by the cam follower is not limited to the sequence described in conjunction with FIGS. 1, 2 and 5. FIGS. 9 through 11 shown in simplified diagrammatic form, other cutting cycles which can be accomplished with the speed link in conjunction with different cam configurations.

In FIG. 9, cross slide cam plate 172, has a cam track or slot 174 with a dog leg or curved portion 176 which will move the slotting blade 70 through a push-through notching stroke and then return the cross slide 132 and notching blade 70 to permit unimpeded travel of the severing blade during the last portion of the downward travel where cam follower 162 will be in vertical portion 178 of cam track 174.

In the embodiment shown in FIG. 10, the cam plate 180 is formed with a cam track 182 having an initial curved portion 184 which will move the cross slide 132 toward the tube T to permit a push through notching cut by slotting blade 70 during the upper portion of an upward ram stroke. The clamping cam would be configured to clamp the tube T at a mid position of the upper and lower limits so that the cam follower 162 would start in the vertical portion 186 just above curve portion 184 and upward movement of the ram raising the cam plate 180 will move the cam follower 162 in the curved portion 184 of the cam track to move the cross slide 132 in a push through notching stroke moving the slotting blade 70 through the tube. When the ram starts its downward stroke, cam follower 162 will retrace its path in curved portion 184 returning the cross slide 132 to its initial position with the slotting blade holder 128 out of the path of the cutoff blade which would continue its descent in a severing stroke while the cam follower 162 moves in vertical slot portion 186 maintaining the cross slide 132 stationary.

In the apparatus shown in FIG. 11, the push through slotting blade 70 has been replaced by draw through hook-shaped slotting blade 188, and the cross slide is shown in a position with the blade holder 128 extending across the tube T for commencement of the draw through notching stroke. In this case, the cam plate 190 has a cam track 192 with an initial curved portion 194 which will move the cam follower 162 away from the tube T to draw the slotting blade 188 across the tube in a notching stroke as the ram moves in a downward stroke. Cam follower 162 then moves into straight portion 196 of the cam track 192 retaining the slotting blade holder 128 out of position during the severing stroke.

The foregoing illustrates the universal application of the speed link with different cross slide cam configurations to accomplish the desired slotting and severing cycle. Other cycles could likewise use the speed link of this invention.

The embodiments of the invention in which an exclusive property or privilege is claimed are defined as follows:

1. A tube cutoff die set for use in a vertically reciprocating press comprising, in combination: a movable upper die shoe; a stationary lower die shoe; means affixed to said shoes for guiding relative vertical reciprocation between said shoes; a cutoff blade mounted on said upper shoe for movement in a vertical tube severing plane; tube holding means mounted on said lower shoe for releasably clamping said tube on both axial sides of said severing plane; slide means mounted on said lower shoe for moving a slotting blade in said severing plane for notching the upper wall of said tube; a speed link pivotably mounted at its lower end to said lower shoe for movement in a plane parallel to said severing plane; a floating driver mounted on said speed link adjacent its upper end, said driver contacting said slide means for movement of said slide means on said lower shoe as said link is rotated; a cam mounted on and depending from said upper shoe and having a follower surface in a plane parallel to said severing plane; a cam follower mounted on said speed link intermediate its upper and lower ends, closer to its upper end, and in contact with said cam surface; said cam surface being configured so that as said upper shoe is moved downwardly toward said lower shoe, said cam follower will be moved transversely, swinging said speed link to move said slide means and said slotting blade across said tube, notching said tube in a stroke amplifying the transverse movement of said cam follower, and further downward movement of said upper shoe moving said cutoff blade through said notched tube wall, severing said tube.

2. A tube cutoff die set for use in a vertically reciprocating press comprising, in combination: a movable upper die shoe; a stationary lower die shoe; means affixed to said shoes for guiding relative reciprocation between said shoes; a cutoff blade mounted on said upper shoe for movement in a vertical tube severing plane; tube holding means mounted on said lower shoe for releasably clamping said tube on both axial sides of said severing plane; slide means mounted on said lower shoe for moving a slotting blade in said severing plane for notching the upper wall of said tube; a speed link pivotably connected to one of said shoes for swinging movement in a plane parallel to said severing plane; a driver mounted on said speed link adjacent its free end, said driver contacting said slide means for movement of said slide means on said lower shoe as said link is rotated; a cam mounted on the other of said shoes and having a follower surface in a plane parallel to said severing plane; a cam follower mounted on said speed link intermediate its pivot and free ends, closer to its free end, and in contact with said cam surface; said cam surface being configured so that as said upper shoe is moved relative to said lower shoe, said cam follower will move transversely, swinging said speed link to move said slide means and said slotting blade across said tube, notching said tube in a stroke amplifying the transverse movement of said cam follower and downward movement of said upper shoe in the lower portion of the press reciprocation, moving said cutoff blade through said notched tube wall severing said tube.

3. The tube cutoff die set according to claim 2 wherein said cam surface is configured so that as said upper shoe is moved downwardly toward said lower shoe, said cam follower will be moved transversely, swinging said speed link to move said slide means in a work stroke toward said tube, pushing said slotting blade across said tube and notching said tube and then returning said slide and moving said cutoff blade through said notched tube wall severing said tube.

4. The tube cutoff die set according to claim 2 wherein said cam surface is configured so that as said upper shoe is moved upwardly from a mid position between its upper and lower limits, said cam follower will be moved transversely, swinging said speed link to move said slide means in a work stroke toward said tube, pushing said slotting blade across said tube and notching said tube, and as said upper shoe is moved downwardly toward said lower shoe, said cam follower will follow the same cam surface to pull said slotting blade across said tube returning said slide means to its initial position, and retaining said slide in its initial position as said upper shoe is moved downwardly past said mid position, the cutoff blade moving through said notched tube wall severing said tube.

5. The tube cutoff die set according to claim 2 wherein said cam surface is configured so that as said upper shoe is moved downwardly toward said lower shoe, said cam follower will be moved transversely, swinging said speed link to move said slide means in a work stroke toward said tube, drawing said slotting blade across said tube and notching said tube, and the continuing downward movement of said upper shoe in the lower portion of the press reciprocation, moving said cutoff blade through said notched tube wall severing said tube.

6. The tube cutoff die set according to claim 2 wherein said cam surface is configured so that as said upper shoe is moved downwardly toward the lower shoe, said cam follower will be moved transversely, swinging said speed link to move said slide means in a work stroke toward said tube, pushing said slotting blade across said tube and notching said tube, and further downward movement of said upper shoe moving said cutoff blade through said notched tube wall, severing said tube.

7. The tube cutoff die set according to claim 6 wherein said slide means includes a slotting blade holder to which said slotting blade is attached, said holder having a slot in said severing plane which aligns with said cutoff blade as said slide means is moved transversely in its work stroke, permitting said cutoff blade to pass through said holder slot as said cutoff blade is moved through said notched tube wall, severing said tube.

8. A tube cutoff die set for use in a vertically reciprocating press comprising, in combination: a movable upper die shoe; a stationary lower die shoe; means affixed to said shoes for guiding relative vertical reciprocation between said shoes; a cutoff blade mounted on said upper shoe for movement in a vertical tube severing plane; tube holding means mounted on said lower shoe for releasably clamping said tube on both axial sides of said severing plane; a slotting blade for notching the upper wall of said tube; a slotting blade holder holding said slotting blade and having a slot in said severing plane to permit passage of said cutoff blade therethrough; a slide mounted on said lower shoe and having said slotting blade holder attached thereto for moving said slotting blade in said severing plane for notching said upper tube wall; a speed link pivotably mounted at its lower end to said lower shoe for movement in a plane parallel to said severing plane; a driver mounted on said speed link adjacent its upper end, said driver contacting said slide for movement of said slide on said lower shoe as said link is rotated; a cam mounted on and depending from said upper shoe and having a follower surface in a plane parallel to said severing plane; a cam follower mounted on said speed link intermediate its upper and lower ends, closer to its upper end and in contact with said cam surface; said cam surface being configured so that as said upper shoe is moved downwardly toward said lower shoe said cam follower will be moved transversely, swinging said speed link to move said slide means in a work stroke toward said tube, pushing said slotting blade across said tube and notching said tube, and further downward movement of said upper shoe moving said cutoff blade through said slotting blade holder slot and through said notched tube wall, severing said tube.

9. A tube cutoff die set for use in a vertically reciprocating press comprising, in combination:
- a movable upper die shoe;
- a stationary lower die shoe;
- means affixed to said shoes for guiding relative vertical reciprocation between said shoes;
- a cutoff blade mounted on said upper shoe for movement in a vertical tube severing plane;
- tube holding means mounted on said lower shoe for releasably clamping said tube on both axial sides of said severing plane;
- a slotting blade for notching the upper wall of said tube;
- a slotting blade holder holding said slotting blade and having a slot in said severing plane to permit passage of said cutoff blade therethrough;
- a slide mounted on said lower shoe and having said slotting blade holder attached thereto for moving said slotting blade in said severing plane for notching said upper tube wall;
- a cam mounted on and depending from said upper shoe and having a follower surface in a plane parallel to said severing plane;
- a cam follower mounted on said slide and in contact with said cam surface; said cam surface being configured so that as said upper shoe is moved downwardly toward said lower shoe said cam follower will be moved transversely in a work stroke toward said tube, pushing said slotting blade across said tube and notching said tube, and further downward movement of said upper shoe moving said cutoff blade through said slotting blade holder slot and through said notched tube wall, severing said tube.

* * * * *